United States Patent [19]

Thomas et al.

[11] 4,161,351

[45] Jul. 17, 1979

[54] ALL-REFLECTIVE OPTICAL TARGET ILLUMINATION SYSTEM WITH HIGH NUMERICAL APERTURE

[75] Inventors: Carlton E. Thomas; Robert D. Sigler, both of Ann Arbor, Mich.; John G. Hoeger, Newport, Calif.

[73] Assignee: The United States of America as represented by the Department of Energy, Washington, D.C.

[21] Appl. No.: 684,095

[22] Filed: May 7, 1976

[51] Int. Cl.² ............................................. G02B 5/10
[52] U.S. Cl. .................................... 350/294; 350/299
[58] Field of Search ................. 350/294, 299, 199, 55, 350/296

[56] References Cited

FOREIGN PATENT DOCUMENTS 501294 6/1930 Fed. Rep. of Germany .............. 350/55

OTHER PUBLICATIONS

Laser Program Annual Report, 1974, "Angle-Amplifying Optics," Glass, pp. 238-239, Oct. 1975.

*Primary Examiner*—Jon W. Henry
*Attorney, Agent, or Firm*—Dean E. Carlson; Randall G. Erdley; Robert A. Choate

[57] ABSTRACT

An all-reflective optical system for providing illumination of a target focal region at high numerical aperture from a pair of confluent collimated light beams. The collimated beams are each incident upon an associated concave eccentric pupil paraboloidal reflective surface, and thereby each focused through an opening in an associated outer ellipsoidal reflective surface onto a plane reflector. Each beam is reflected by its associated plane reflector onto the opposing concave surface of the outer ellipsoids to be focused through an opening in the plane surface onto an opposing inner concave ellipsoidal reflective surface, and thence onto the target region.

10 Claims, 2 Drawing Figures

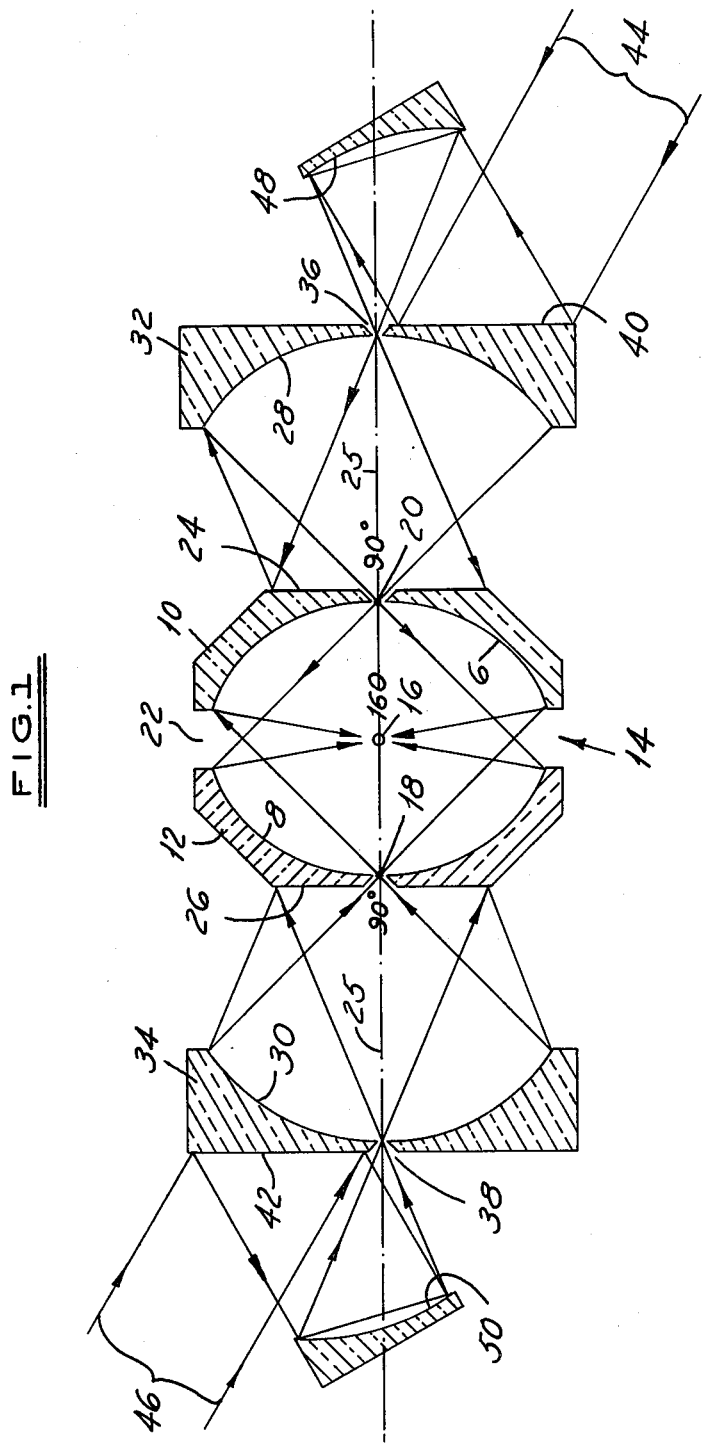

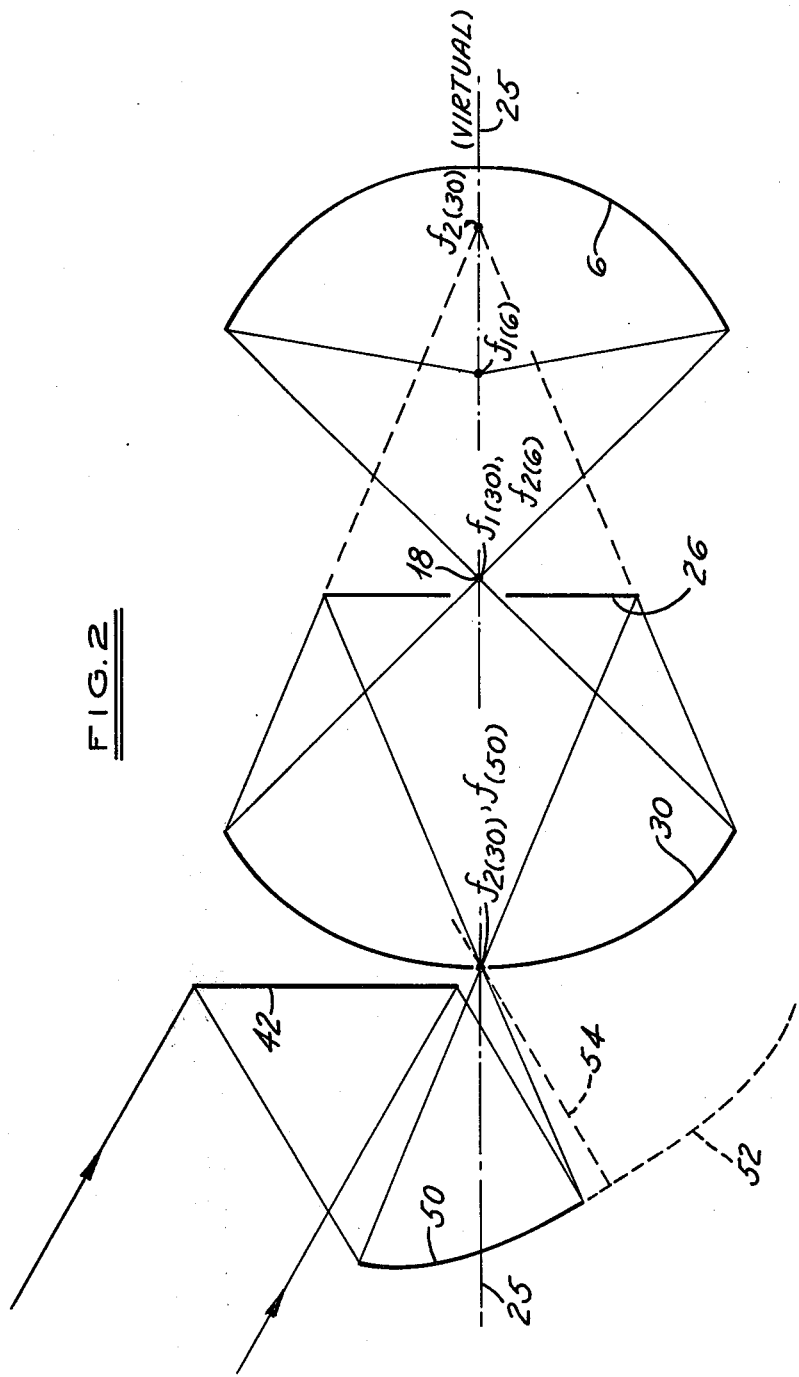

ALL-REFLECTIVE OPTICAL TARGET ILLUMINATION SYSTEM WITH HIGH NUMERICAL APERTURE

The present invention relates to focused optical systems and, more specifically, to optical systems for providing illumination of a target focal region at high numerical aperture.

Combinations of reflective and refractive optics have heretofore been proposed and/or used to provide high numerical aperture illumination at a target focal region. One example of such a reflective/refractive system is disclosed in Thomas. "Optics for Laser Fusion," Laser Focus, Advanced Technology Publications. Inc., Newton, Mass., June 1975, pages 49–51. In the Thomas system, convergent collimated laser beams are focused by a pair of fast (high numerical aperture or, stated differently, low f-number) aspheric lens into a target cavity defined by a pair of opposing ellipsoidal reflectors. One focus of each reflector and the focus of the associated lens are located in coincidence at a vertex opening in the opposing reflector, while the other reflector foci are substantially coincident at the cavity center. Each beam provides substantially uniform, orthogonal and complete coverage of an opposing hemisphere of the target region. Where the requirement for normal or orthogonal incidence at the target region is removed and the reflector foci are slightly separated from the target center, full target coverage is obtained. The reflective/refractive system so disclosed has been used quite successfully in laser fusion experiments, some results of which are noted in detail in the above-referenced Thomas publication.

Some inherent disadvantages of the Thomas system have heretofore been noted. For example, in Glass, "Design of Aspheric Optics," Laser Program Annual Report-1974, Lawrence Livermore Laboratory, Livermore, Ca., 1975, pages 234–239, it was noted that, because of the relatively high nonlinear index of glass from which the refractive elements, i.e., the lenses, are ground, the amount of refractive material in each beam path should be minimized to reduce distortion. To obtain high numerical aperture focusing in systems of the type described, Glass proposed that the relatively fast (80° cone angle) Thomas focusing lens be replaced by a slower lens having a focused cone angle of about 46.6°. The focal point of the Glass lens is at a vertex opening of a supplementary or outer ellipsoidal reflector having its first focus at the entrance to the Thomas cavity, i.e., at the vertex of one of the cavity-defining inner ellipsoidal reflectors. A plane mirror is disposed at the supplementary reflector focus normal to the axis of the collimated incident beam and effectively "folds" the second focus of the supplementary reflector into coincidence with the lens focus. The supplementary ellipsoidal and plane mirrors effectively amplify the cone angle of the focused beam such that the beam at the entrance to the target cavity has a cone angle at least a great as the 80° entrance cone angle of the Thomas system.

Although the Glass proposal may have certain advantages over the Thomas system, the proposal at best merely reduces inherent non-linearity problems and limitations associated with the use of refractive optics in high numerical aperture illumination systems of the type described. However, several problems remain unsolved. For example, there are difficulties in coating the relatively steep surfaces of the focusing lens for the purpose of reducing reflection losses. As a result, energy loss on the order of ten to fifteen per cent has resulted due to reflections at the lens. Furthermore, the lens index of refraction is a non-linear function of beam field strength. Thus, variations or "hot spots" in beam spatial profile affect the focal properties of the lens in a way which tends to increase the size of the focal spot, and to reduce the overall efficiency of target illumination. Internal reflections may also cause severe lens damage. To help limit the problems associated with internal reflections, the lenses in the Thomas system, for example, have been cored, a time consuming and expensive operation.

Moreover, the lens refractive index and focal properties vary with beam frequency. Thus, a refractive element designed for use at one preselected frequency must be either replaced by a second lens for operation at a different illumination frequency, or supplemented by one or more spheric or aspheric corrector plates, thus adding additional glass in each beam path. In any case, unless expensive multimaterial achromatic refractive elements are used, the entire system must be refocused for each illumination frequency. Target illumination with a high numerical aperture beam having several frequency components has not been attempted, particularly in laser fusion experiments, due in part to the above-mentioned inherent limitations and focusing problems associated with refractive optics.

It is an object of the present invention to provide a high numeridal aperture target illumination system which eliminates the above-mentioned difficulties of the reflective/refractive systems heretofore used or proposed. More specifically, it is an object of the present invention to provide an all-reflective high numerical aperture system for optically illuminating a target region.

It is a further object of the present invention to provide an all-reflective high numerical aperture illumination system of the described type wherein some or, preferably, all of the non-plane reflectors have reflective surfaces contoured as simple conic sections, i.e., spheres, ellipsoids, paraboloids and hyperboloids, such that such reflectors are economical to fabricate and test.

It is yet another object of the present invention to provide an all-reflective high numerical aperture illumination system of the described type which finds specific use and advantage in the conduction of laser-driven fusion research.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a sectional schematic view of a presently preferred embodiment of the optical system provided in accordance with the invention; and FIG. 2 is a schematic view of a portion of FIG. 1 selected to facilitate understanding of the invention.

Referring to FIG. 1, a pair of spaced, co-axial concave ellipsoidal reflective surfaces or reflectors 6, 8 are formed on the mirrors 10, 12 and define a target cavity 14 in accordance with the above-referenced Thomas publication. Reflective surfaces 6, 8 have respective first focal points in substantial coincidence within a target region 16. The second focal points of reflectors 6, 8 are located at the centers 18, 20 of conical vertex openings in opposing reflectors 8, 6, respectively. Mirrors 10, 12 are separated by a space 22.

A plane reflective surface 24 is formed on the back or outside of mirror 10 (relative to target cavity 14) normal to the axis 25 of surfaces 6, 8, which axis will be referenced hereinafter as the system axis. A complementary, oppositely directed planar reflective surface 26 is formed on the outside of mirror 12. Reflectors 24, 26 are preferably formed as near as possible to opening centers 20, 18 to reduce the aperture dimensions, but are spaced therefrom by the minimum inter-surface thickness required to facilitate fabrication and handling of the respective mirrors 10, 12. A pair of outer ellipsoidal reflective surfaces 28, 30 are formed on the mirrors 32, 34 and have respective first focal points coincident with opening centers 20, 18 on system axis 25. Mirrors 32, 34 have conical openings 36, 38 formed on system axis 25 at the vertic of surfaces 28, 30, respectively. The structure thus far described, i.e., the combination either of surfaces 30, 26 and 6 or of surfaces 28, 24 and 8, is similar in concept to that proposed in the above-referenced Glass publication.

In accordance with the present invention, a pair of oppositely directed plane reflective surfaces 40, 42 are formed on the outside of mirrors 32, 34 and disposed to intercept the generally confluent collimated light beams 44, 46, respectively. Reflectors 40, 42 are preferably normal to system axis 25.

A pair of paraboloidal reflectors 48, 50 are disposed on system axis 25 outwardly of surfaces 40, 42 at an angle with respect thereto to intercept input beams 44, 46 after the latter have been reflected by plane reflectors 40, 42, respectively. Reflectors 48, 50 are each formed of an eccentric or off-axis section of a full-pupil paraboloid, and are, hence, referenced in the art as eccentric pupil paraboloids. The focal points of reflectors 48, 50 are disposed at the respective vertices of reflectors 28, 30 such that the collimated beams incident upon reflectors 48, 50 are focused through openings 36, 38 at preferred cone angles of about 45°. The respective beams are then successively incident upon and reflected by surfaces 24, 28 and 26, 30, and focused at centers 20, 18 at preferred cone angles of about 90°. The respective illuminating cone angles are further amplified by surfaces 8, 6, such that the beams converge on target region 16 at cone angles of about 160°.

To facilitate understanding of the invention, the geometric relationship among the reflectors hereinabove described is further depicted in FIG. 2, in which one reflector combination 6, 26, 30, 42, 50 has been selected for illustration. It will be evident that the reflector combination not shown in FIG. 2 is complementaty but otherwise identical to that depicted. As indicated above, focus $f_{1(6)}$, i.e., the first focus ($f_1$) of reflector 6, is disposed at the target region (not shown). Foci $f_{1(30)}$ and $f_{2(6)}$ re coincident with opening center 18. Reflector 26 effectively "folds" reflector focus $f_{2(30)}$ to the vertex of reflector 30, such that focus $f_{2(30)}$ is coincident with the parabola focus $f_{(50)}$. The virtual focus corresponding to focus $f_{2(30)}$ is depicted in phantom. To further illustrate the eccentric section presented by reflector 50, the surface contour thereof is extended beyond the reflector perimeter at 52, also in phantom, and the overall paraboloid axis is depicted at 54 to illustrate the relationship of the paraboloid geometry to the system axis.

It will be evident to those skilled in the art that the parameters of the reflectors shown in FIG. 2 may be derived for a selected application using well-known optics formulas for conic sections.

For purposes of illustrating one embodiment of the invention, for reflector 6:
  separation from focus $F_1$ . . . 5.000 inches
  separation from focus $f_2$ . . . 10.000 inches
  vertex radius . . . −6.667 inches
  eccentricity . . . 0.3333 (1/3).

For reflector 30:
  separation from focus $f_1$ . . . 8.870 inches
  separation from vertical focus $f_2$ . . . 16.980 inches
  separation between reflectors 30, 36 . 8.490 inches
  vertex radius . . . 11.653 inches
  eccentricity . . . 0.31373.

For reflector 50:
  reflector/focus separation . . . 5.945 inches
  vertex radius . . . −11.891 inches
  eccentricity . . . 1.000.

The remaining reflector and system parameters may be readily derived given the above information, a selected input beam diameter, the desired beam cone angles, etc.

Each of the reflective surfaces 6, 8, 24–30, 40–42 and 48–50 is preferably comprised of multiple layers of dielectric coating deposited on a glass/ceramic substrate having a low or zero coefficient of thermal expansion. Alternatively, a substrate of nickel-plated aluminum may be used. It will be appreciated, of course, that the system of the present invention shown in the drawings is illustrated primarily in schematic form and that various mechanical details which would be self-evident to persons skilled in the art have been omitted. For example, each of the depicted reflective elements and the target area 16 is three-dimensional in actual practice, and is symmetrical into and out of the drawing as shown. Further, each of the system elements is preferably to be carried by a suitable gimbal mounting arrangement for independent adjustment in several directions. Mirrors 10 and 12 are to be mounted for three-dimensional linear adjustment, and for rotation about the axes transverse to and into the drawing. Inasmuch as these elements are symmetrical about longitudinal system axis 25, means for adjustable rotation about the system axis need not be provided. Mirrors 32, 34 and reflective surfaces 48, 50 are to be mounted for adjustment along and rotation about each of the three principal axes.

Moreover, it will be evident that the confluent geams incident upon reflecting surfaces 40, 42 should comprise split portions of a single laser beam to help insure simultaneous illuminating of the target region from both directions, as described in the above-referenced Thomas publication. Thus, a single laser beam may be directed onto a 50/50 beam-splitter, with the split beams 44, 46 being then directed by suitable mirrors, etc. onto surfaces 40, 42. Although collimated beams 44, 46 are depicted in FIG. 1 as being generally directed toward each other along parallel, off-set beam axes, it will be apparent that each of the reflector combinations 40, 48 and 42, 50 is independently adjustable about system axis 25. The collimated beams may approach one another co-axially or along mutually angulated axes where such is otherwise convenient. Hence, the invention is described herein as being useful for focusing collimated, generally confluent light beams, i.e., beams approaching one another in the area of target region 16.

From the foreging description, it will be apparent that the high numerical aperture target illumination system provided in accordance with the present invention completely eliminates all of the abovenoted problems and disadvantages associated with the use of refractive elements in such systems, and fully satisfies all of the other objects and aims set forth above. For example, the non-planar reflecting surfaces 6, 8, 28, 30, 48 and 50 are all simple conic sections, and are therefore economical to fabricate and test. Obscuration, which is a measure of the percentage of illuminating energy lost at the target region due to the mirror openings, is less than one per cent in the specific example noted above.

Although the invention has been described in connection with one specific, presently preferred embodiment thereof, many alternatives, modifications and variations will suggest themselves to persons skilled in the art in view of the foregoing description. For example, the gap 22 between mirrors 10, 12 is provided to allow observation of the effects of target illumination, as discussed in detail in the above-referenced Thomas publication. However, where such observation is not required, the present invention may be readily modified to provide full 180° illumination normal at all points to the target region, a result for which the Thomas refraction/reflection system cannot be directly adapted because of the inherent refraction index limitations of the aspheric lens elements.

Furthermore, although reflective surfaces 40, 42 are depicted as being conveniently formed on the same mirror elements as are surfaces 28, 30, it will be evident that, where otherwise convenient, separate plane reflective elements may be provided and surfaces 48, 50 may be oriented with respect thereto to yield all of the advantages described above. Indeed, where the remaining elements may be suitably oriented with respect to input beams 44, 46, e.g., where system axis 25 may be oriented in a direction generally orthogonal to the direction of beam confluence, the input beams may be made directly incident upon reflectors 48, 50, and reflecting surfaces 40, 42 may be eliminated. However, it has been found that, where the input beams approach at an appreciable angle with respect to the system axis, reflectors 48, 50 must be formed of extreme off-axis parabolic sections, and fabrication and test of the reflectors become very difficult and expensive. Moreover, the proposed modification tends to induce undesirable non-uniform aberrations in the illuminating beam. For all of these reasons, the embodiment depicted and hereinabove described is presently preferred. However, the present invention is intended to embrace the above-noted and all other alternatives, modifications and variations as fall within the spirit and broad scope of the appended claims.

We claim:

1. In an optical system for providing illumination of a target region at high numerical aperture from a pair of generally confluent collimated beams of electromagnetic energy, and comprising a pair of opposed first ellipsoidal reflectors disposed to define a target cavity and having respective first openings on a system axis, a pair of plane reflectos disposed and directed outwardly of said target chamber normal to said system axis, and a pair of second ellipsoidal reflectors disposed and directed oppositely of respective plane reflectors and having respective second openings on said system axis, the improvement comprising first and second eccentric pupil paraboloidal reflectors respectively disposed on said system axis outwardly of a second ellipsoidal reflector to intercept and focus one of said collimated beams into the opening of the associated second ellipsoidal reflector.

2. The improvement set forth in claim 1 further comprising a second pair of plane reflectors respectively disposed and directed outwardly of said second ellipsoidal reflectors to intercept and direct said collimated beams onto said first and second eccentric pupil paraboloidal reflectors respectively.

3. The improvement set forth in claim 2 wherein said second pair of plane reflectors are disposed normal to said system axis.

4. The improvement set forth in claim 2 wherein each of said second pair of plane reflectors is formed on the outside surface of an associated one of said second pair of ellipsoidal reflectors.

5. The improvement set forth in claim 1 wherein each of said first pair of plane reflectors is formed on the outside surface of an associated one of said first pair of ellipsoidal reflectors.

6. An optical system for providing illumination of a target region at high mumerical aperture from a collimated beam of electromagnetic energy comprising first ellipsoidal reflector means having a first focus at said target region and a second focus displaced therefrom on a system axis, second ellipsoidal reflector means having a first focus disposed in substantial coincidence with said second focus of said first reflector means, plane reflector means disposed between said first and second reflector means and directed toward said second reflector means to locate the second focus of said second reflector means proximate the reflective surface thereof, said second and said plane reflector means having openings on said system axis, and third reflective means including an eccentric pupil reflector disposed outwardly of said second reflector means to intercept and focus said collimated beam to said second focus of said second reflector means.

7. The system set forth in claim 6 wherein said eccentric pupil reflector has a reflective surface of paraboloidal contour.

8. The system set forth in claim 6 wherein said reflective means further comprises a second reflector disposed in the path of said collimated beam and oriented to reflect said collimated beam onto said eccentric pupil reflector.

9. The system set forth in claim 8 wherein said eccentric pupil reflector has a reflective surface of paraboloidal contour, and wherein said second reflector has a plane reflective surface contour.

10. In an optical system for providing illumination of a target region at high numerical aperture from a collimated beam of electromagnetic energy, and comprising ellipsoidal reflector means having a first focus at said target region and a second focus displaced therefrom on a system axis and reflective means disposed to intercept said collimated beam and to focus said beam at said second focus co-axially with said system axis, whereby said focused beam is incident upon said ellipsoidal reflector and is reflected thereby at high beam aperture onto said target region, the improvement wherein said reflective means comprises an eccentric pupil reflector having an axis of rotational symmetry on one side of said eccentric pupil reflector disposed to intercept said collimated light beam from a direction parallel to said axis of symmetry and to focus said beam onto said system axis.

* * * * *